United States Patent
Richter

[11] Patent Number: 4,479,302
[45] Date of Patent: Oct. 30, 1984

[54] TRIMMER FOR LAWN SPRINKLERS

[76] Inventor: Werner H. Richter, 418 Cabrillo Rd., Arcadia, Calif. 91006

[21] Appl. No.: 514,558

[22] Filed: Jul. 18, 1983

[51] Int. Cl.³ .................... A01B 45/00; A01D 35/00
[52] U.S. Cl. ........................................ 30/122; 30/300; 30/DIG. 7; 172/14
[58] Field of Search ............. 30/122, 287, 300, 301, 30/276, 316, 347, 264, DIG. 5, DIG. 7; 172/13, 14, 17

[56] References Cited

U.S. PATENT DOCUMENTS

| | | | |
|---|---|---|---|
| 2,691,823 | 10/1954 | Dombrowski | 30/300 |
| 3,143,176 | 8/1964 | Drane | 30/316 |
| 3,174,224 | 3/1965 | Rousselet | 30/264 |
| 3,656,554 | 4/1972 | Buhner | 172/14 |
| 3,680,639 | 8/1972 | Davis | 172/15 |
| 3,877,146 | 4/1975 | Pittinger | 30/347 X |
| 3,905,103 | 9/1975 | Ford | 30/DIG. 7 |
| 3,923,102 | 12/1975 | Morris | 172/13 |
| 3,938,249 | 2/1976 | Chacon | 30/300 |
| 4,022,283 | 5/1977 | Morgan | 172/15 |
| 4,357,752 | 11/1982 | Goodwin | 30/122 |

Primary Examiner—Jimmy C. Peters
Attorney, Agent, or Firm—Edgar W. Averill, Jr.

[57] ABSTRACT

A cup-shaped grass cutting implement which is removably attached to existing rotary cutting heads of powered edgers of the type that can orient the cutting head to rotate about a vertically displaced axis. A quick disconnect feature which allows the cup-like attachment to be retained by the flat blade of such a powered rotary cutting head without interfering with the already assembled blade. The invention provides for a quickly administered pair of retainment fingers which surround the flat cutting blade at points slightly apart from the shaft arrangement for rotating such flat blades.

5 Claims, 5 Drawing Figures

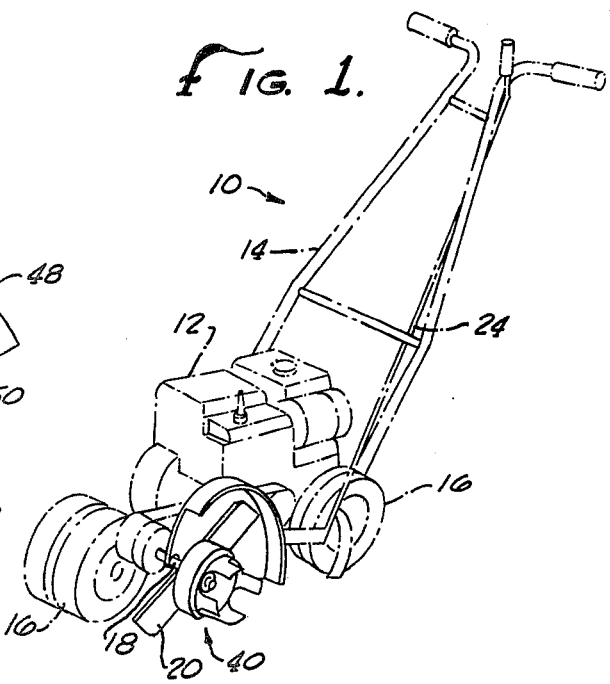
fig. 1.
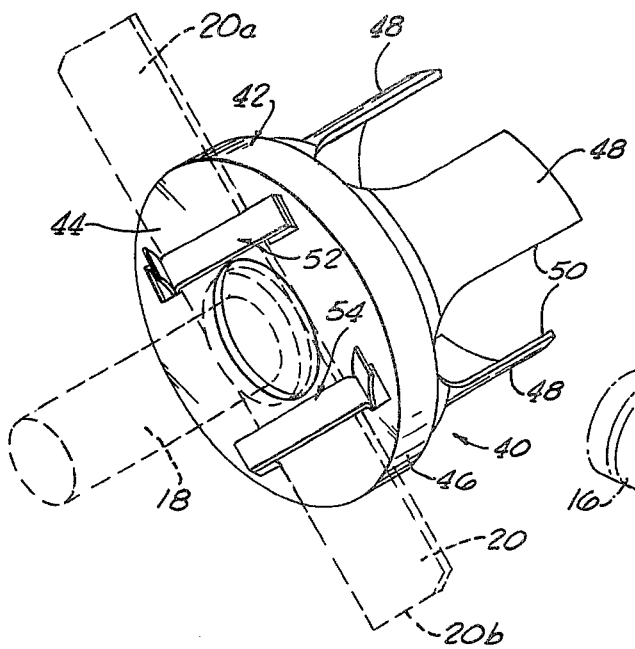
fig. 2.
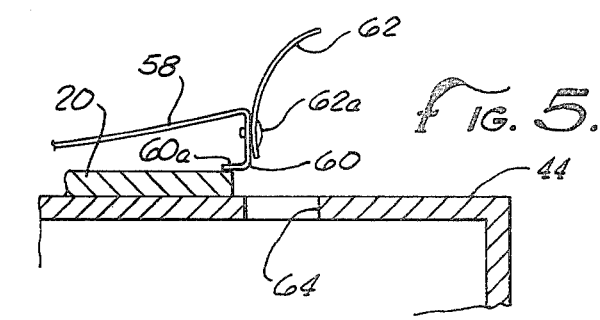
fig. 3.
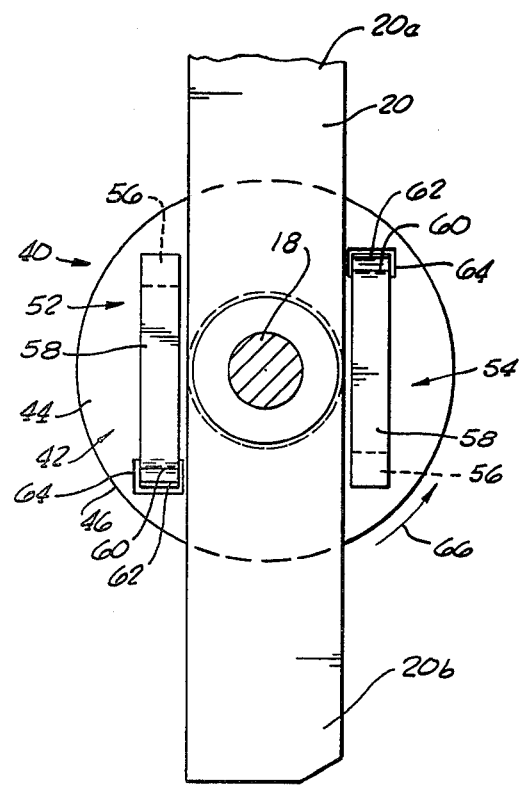
fig. 4.
fig. 5.

TRIMMER FOR LAWN SPRINKLERS

BACKGROUND OF THE INVENTION

The present invention relates to grass trimming devices and more particularly to power-operated rotary tools which removes excess growth of grass and related plants from the proximity of lawn sprinkler heads.

It has been a well-known problem in recent years to remove excess growth of grass, and the like, from the vicinity of sprinkler heads. Grass and other plant growth have a tendency to grow in excessive amounts and at accelerated rates in the vicinity of such heads. The over-abundance of undesired moisture and the accumulation of fertilizers in such areas causes the problem of undesired appearance and sprinkler head deficiency to occur in a frequent manner.

Attempts to alleviate the problem have been done with such complicated devices as illustrated in U.S. Pat. No. 3,174,224, issued to L. H. Rousselet utilizing a hand held motor driven unit resembling a post hole digger which is held over the sprinkler head and then actuated to perform the cutting operation. This type of trimming job entails the use of a complicated unit which is used separately from other gardening equipment thereby causing additional cost and labor for the person grooming the lawn. The Ford et al., U.S. Pat. No. 3,905,103, shows a similar mechanism.

Another method to attain the trimming of the growth is shown in Davis, U.S. Pat. No. 3,680,639, which attempts to place a sprinkler head trimmer onto a power operated edging mechanism. A series of complicated connecting levers and controls offer a device which takes a number of motions to manipulate and to operate and adds to the cost of the device.

More recently, the U.S. Pat. No. 4,022,283, issued to Morgan, illustrates a machine to remove such growth.

While an effort was made in the patent to Morris, U.S. Pat. No. 3,923,102, the device shown still requires attachment and removal from the actual rotary drive means. This requires the use of additional tools to accomplish the task and thereby takes more time than is desired. If the device is not removed from the blade, it presents a severe safety hazard as well as interfering with edging near bushes, walls or other vertical matter. Because of the design of the blade in Morris, it is not practical to provide means for quickly connecting or disconnecting the sprinkler trimming blade to the existing edge trimming blade.

The need is apparent, that an apparatus for trimming away the excess growth of plant life from the proximity of sprinkler heads, and the like, whether they be at ground level or recessed below the surface, is needed by the present art.

SUMMARY OF THE INVENTION

In accordance with the present invention, a power driven edger and accompanying trimming apparatus of the type which can trim both on a vertical and horizontal plane, is provided with a simple inverted type cup-shaped blade arrangement which is quickly and positively placed onto an existing flat blade of a power edger.

It is, therefore, an object of this invention to provide an attachment for such power driven edgers which quickly adapts onto the device at the point of the rotary cutting end.

It is a further object of this invention to provide an apparatus for easily and positively locking the trimming attachment of the invention to a flat, elongated cutting blade located at the end of the drive shaft.

It is also an object of this invention to provide a method of attachment which prevents accidental disengagement of the cup-like cutting blade from the flat rotating cutting blade of the edger device.

These and other objects and advantages will be more readily apparent with reference to the following description and claims in light of the accompanying drawing.

BRIEF DESCRIPTION OF THE DRAWINGS

FIG. 1 is a perspective view illustrating a conventional edger with the subject of the invention attached thereto.

FIG. 2 is an enlarged perspective of the cutting attachment.

FIG. 3 is an enlarged section, with certain parts in elevation, of the trimmer head as it is shown being placed over an installed sprinkler head.

FIG. 4 is a top plan view of the device of FIGS. 1 through 3.

FIG. 5 is an enlarged fragmentary section of a portion of FIG. 3 showing the retainment member in a disengaging mode.

DESCRIPTION OF A PREFERRED EMBODIMENT

The perspective view of FIG. 1 illustrates a conventional powered edger assembly 10 having an engine 12 mounted thereupon. The control handle 14 along with wheels 16 is shown to have a power output shaft 18 and a flat blade member 20.

The blade 20 comprises outwardly extending portions 20a and 20b having respective cutting edges. A blade retainment means 22 is affixed to form a nut and bolt assembly which is conventional and is familiar to those versed in such art. A cutting depth adjustment handle 24 permits raising and lowering of the cutting head to facilitate not only edging but also the trimming operation of the present invention. A tilt control handle can be actuated by the operator in order to bring the cutting head from a horizontally disposed axis to that of a vertically disposed axis of rotation. In FIG. 1 the various components of the edger assembly 10 are shown in broken lines in order to more fully present the invention which is heretofore shown in full lines.

The ground 26 is generally shown as having a covering of grass and a sprinkler head 28 is shown in FIG. 3 as being placed there within a recess 30. The grass 32 is shown having grown profusely into the opening 30 and it is the object of this invention to remove such growth.

The overall sprinkler head trimmer assembly is shown at 40 and basically comprises a cup body 42. The cup body has a flat circular base portion in the form of a plate 44 and the plate 44 has an annularly and downwardly disposed flange 46. The flange is made in such a manner that it will penetrate far enough down into any opening where the growth has taken hold and yet not deep enough to allow the sprinkler head to come into contact with the fastening assembly 22 of the powered edger. Extensions 48 are shown spaced about the overall head 40 and these extensions are formed to create cutting blades which have edges 50 for the removal of the undesired growth.

Mounted on the plate 44 is a pair of clamping or blade encompassing assemblies 52 and 54. As shown in FIG. 2, the assemblies 52 and 54 straddle the edges of the blade 20 at a point which is spaced away from the drive axle 18. Spacer blocks 56 are shown affixed to the plate 44 and to the elongated strips 58 of the assemblies 52 and 54. At the ends of these spring members 58 which are away from the blocks 56, an offset portion 60 is shown projecting through slots 64 which have been located on the flat plate 44. A pull tad 62 is shown as being affixed to this latching end 60 in such a manner so that an operator can easily grasp the end of the spring members 58 by lifting them up in the manner shown in FIG. 5. It can be seen that the inwardly facing extensions 60a are positioned beneath the plate 44 during the retaining mode. The extension 60a can be easily be deflected and moved out of the slot in order to release the blade 20 from its locked-in position. In FIG. 5, there is shown an attachment rivet 62a holding the pull tab 62 to the spring 58. The fastening process can alternatively be accomplished by brazing, or the like.

In operation, the cutting blade 20 abuts the spacer blocks 56 and rotates the sprinkler head trimmer assembly. Even if the trimmer assembly is to hit an impediment, the spacer blocks are firmly enough welded or otherwise affixed to plate 44 to prevent any damage to the assembly.

It is to be noted that the strips 58 are shown, specifically to FIG. 4, as being mirror images of one another in order to allow the cutter head 40 to be placed up against the flat edger blade 20 in the manner shown and then to encompass the blade 20 when the cup-like arrangement is rotated into the direction of the arrow 66.

In order to remove the assembly 40 from the blade 20, it can be seen that it is a simple procedure to manually pull the tab 62 and then rotate the member 40 in a direction opposite that of arrow 66 thereby releasing contact between the two components. As can be seen in FIG. 3 after the tab 62 has been pulled back to lift spring member 58 out of slot 64, the spring member then rests upon the top of blade 20 so that it is not necessary to lift both tabs at once to release the blade. It can be seen that the inwardly extending portion 60a of the downwardly extending portion 60 rests on the upper surface of blade 20 once the assembly has been raised from slot 64.

The materials used in the fabrication of the cutter head 40 and the retaining assemblies 52 and 54 can be such that they would withstand the rotating cutting force of the device when it is applied to the trimming of vegetation, and the like. Preferably, materials such as steel would retain a longer life span than those of some lighter and softer items as plastic or aluminum.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. Apparatus for trimming away excess growth from the area around sprinkler heads and which is easily removable from a powered rotary cutter blade assembly of a powered driven edger, especially of the type having cutter blade rotation about a vertical axis, which comprises:

cup-shaped cutter member having a circular flat base plate, a depending annular flanged portion affixed to said circular flat base plate at the outer peripheral edge of the circular flat plate and of a dimension sufficient to be placed about a lawn sprinkler head without coming in contact with the head;

cutter portions formed about said flanged extension;

attachment means affixed to the surface of the circular flat base plate on the opposite side from which the flanged extension is located; and the circular flat base plate being formed with a clearance aperture for allowing portions of the powered driven edger blade attachment to pass therethrough.

2. The apparatus as set forth in claim 1 wherein the attachment means comprises a pair of resilient retaining strips, each of which is affixed to a spacer at one end, said spacer being attached to said circular plate, and each retaining strip having an offset portion at its opposite end and of such a dimension so as to be able to pass through aligned slots in the circular plate while retaining the ends of a flat cutting blade which forms a part of the powered edger, the offset portions having retaining lugs which lugs are offset a sufficient amount to retain the first offset portions from being withdrawn from said slots.

3. The apparatus as set forth in claim 2 wherein a tab gripping projection is affixed to the first offset portion of the resilient elongated retaining strip.

4. The apparatus as set forth in claim 3 wherein the tab is affixed by a rivet to the first offset portion.

5. The apparatus as set forth in claim 3 wherein the resilient elongated retaining strips are mirror images of one another and are placed at a distance away from the center of the circular plate so as to straddle the drive shaft of the powered edger and its corresponding blade, and in such a manner that the cup-shaped cutter member can be rotated to accept the flat cutting blade between the retaining strips and the circular plate when the offset portions and the corresponding strips have been withdrawn and raised away from the slots within the circular plate.

* * * * *